United States Patent [19]

Cullen

[11] Patent Number: 5,708,740
[45] Date of Patent: Jan. 13, 1998

[54] OPTICAL NOTCH FILTER MANUFACTURE IN OPTICAL FIBRE WAVEGUIDE BY PLASTIC DEFORMATION

[75] Inventor: Thomas John Cullen, Bishop's Stortford, United Kingdom

[73] Assignee: Northern Telecom Limited, Montreal, Canada

[21] Appl. No.: 628,579

[22] Filed: Apr. 4, 1996

[30] Foreign Application Priority Data

Apr. 4, 1995 [GB] United Kingdom ............... 9506932

[51] Int. Cl.$^6$ .................. G02B 6/26; G02B 6/42
[52] U.S. Cl. .................................. 385/39
[58] Field of Search ................... 385/27, 39, 37, 385/147

[56] References Cited

U.S. PATENT DOCUMENTS

| | | | |
|---|---|---|---|
| 4,701,009 | 10/1987 | Tangonan et al. | 385/14 |
| 4,946,250 | 8/1990 | Gonthier | 350/96.29 |
| 5,039,190 | 8/1991 | Blonder et al. | 385/31 X |
| 5,048,909 | 9/1991 | Henry et al. | 385/37 X |
| 5,093,876 | 3/1992 | Henry et al. | 385/28 |

FOREIGN PATENT DOCUMENTS

| | | |
|---|---|---|
| 1284282 | 5/1991 | Canada . |
| 0 211 582 | 2/1987 | European Pat. Off. . |
| 2 155 621 | 9/1985 | United Kingdom . |

OTHER PUBLICATIONS

Brophy, "In-Line Singlemode Fibre Interferometer Via Concatenated Biconical Tapers", Electronics Letters, vol. 29, No. 14, Jul. 8, 1993.

Pole, "Two-mode fibre spatial-mode converter using periodic core deformation", Electronics Letters, vol. 30, No. 17, Aug. 18, 1994.

*Primary Examiner*—Akm E. Ullah
*Attorney, Agent, or Firm*—Lee, Mann, Smith, McWilliams, Sweeney & Ohlson

[57] ABSTRACT

An optical notch filter is created in a bared length of single mode fibre by using a microburner and longitudinal stretching of the fibre to form a set of equispaced sharply localized non-adiabatic biconical tapers at a pitch corresponding to the beat length between the core-guided $HE_{11}$ mode and the cladding-guided $HE_{12}$ mode, the latter being stripped downstream of the tapers by a plastics protective coating surrounding the fibre.

10 Claims, 7 Drawing Sheets

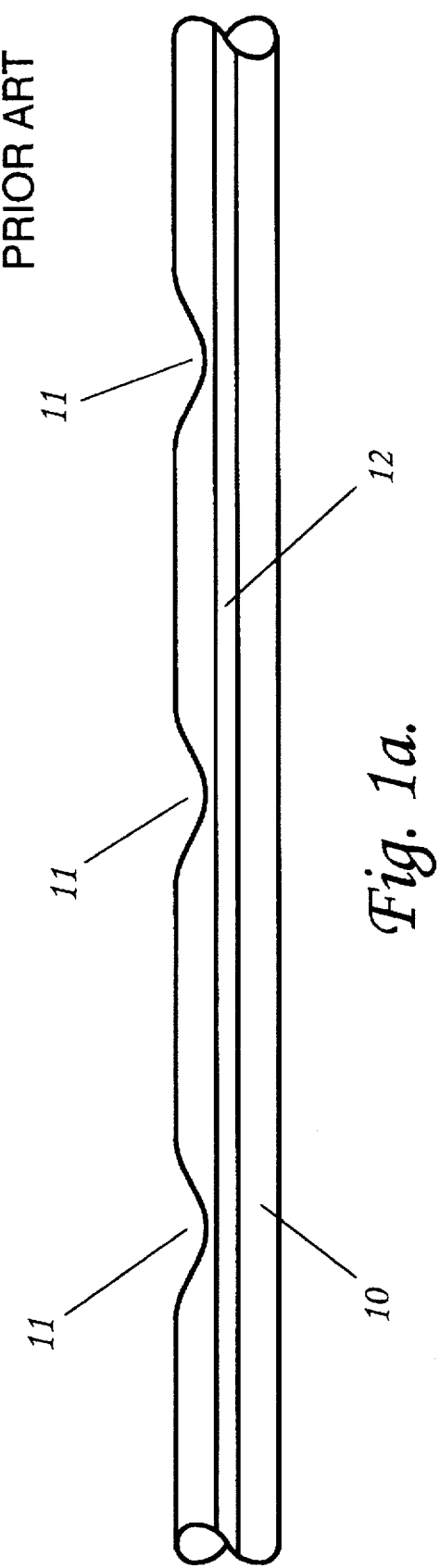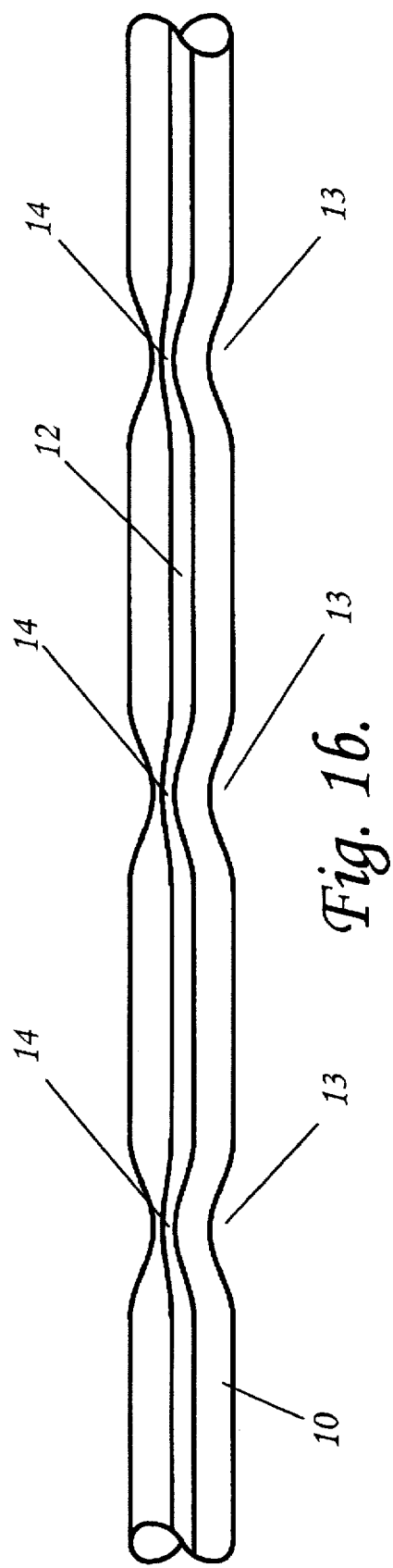

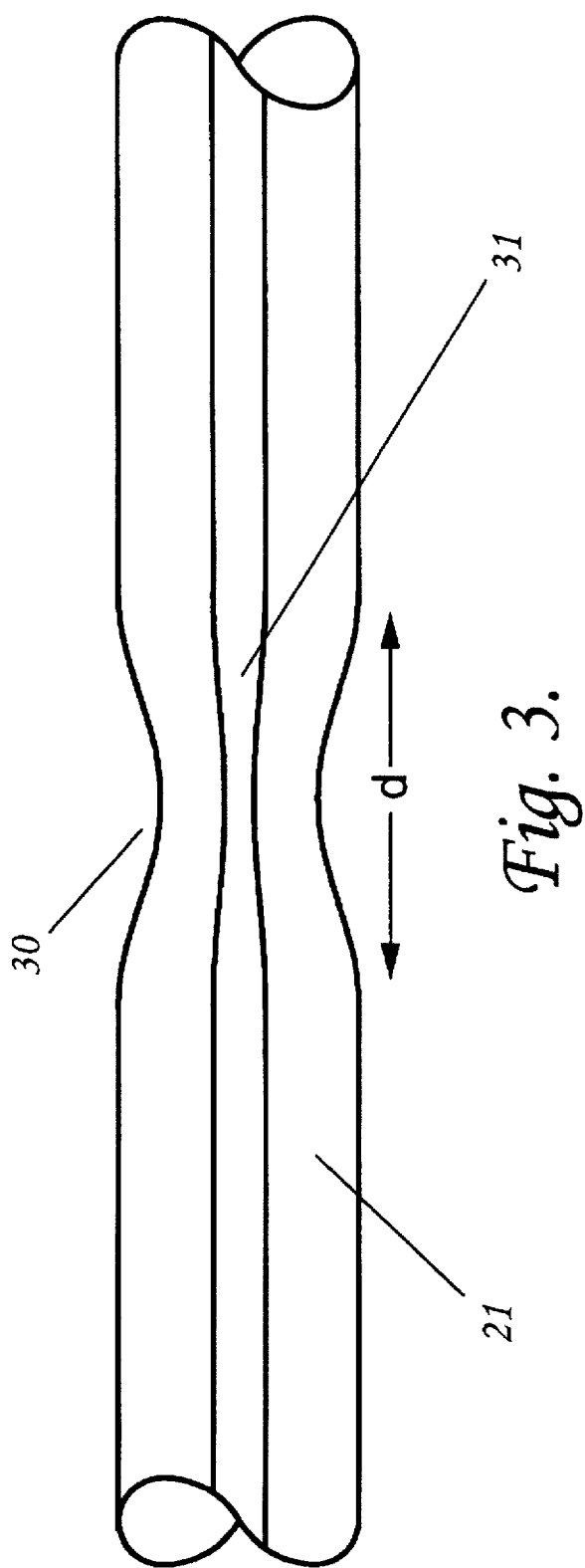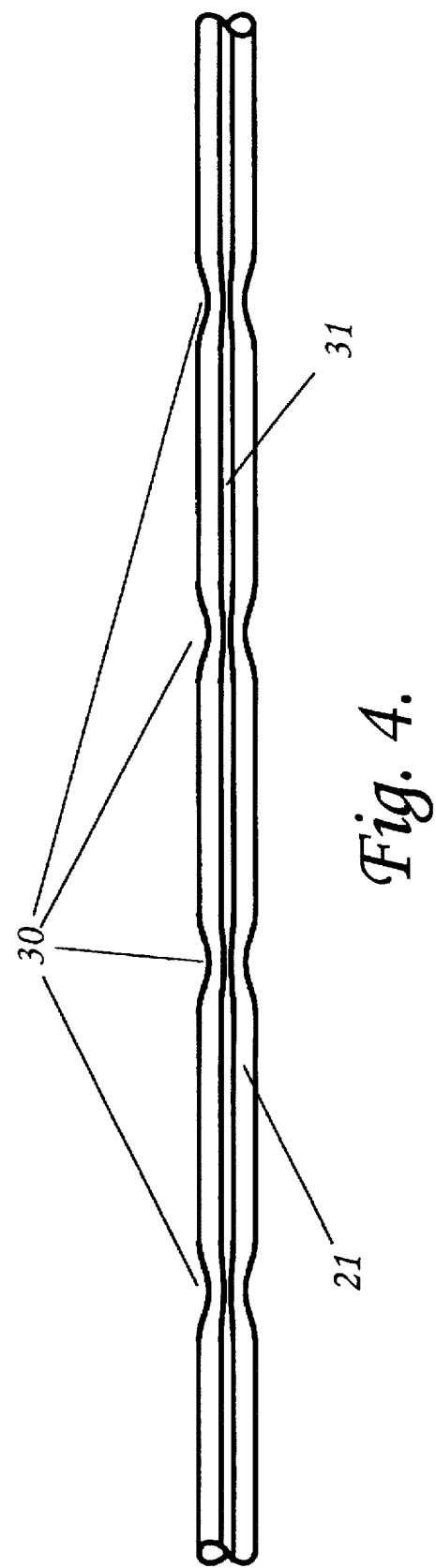

OPTICAL NOTCH FILTER MANUFACTURE IN OPTICAL FIBRE WAVEGUIDE BY PLASTIC DEFORMATION

BACKGROUND OF THE INVENTION

This invention relates to optical fibre optical notch filters. It is disclosed in GB 2 155 621 that, by pressing an optical fibre against a ribbed surface so as to induce microbending with a particular periodicity, mode coupling can be induced at a selected wavelength between a mode guided by the core of the fibre (core mode) and one or more modes which are guided by the cladding (cladding modes), and which are attenuated relatively highly in comparison with the core mode. Such a device operates in transmission to attenuate selectively light at the wavelength at which such mode coupling occurs.

A letter by C. D. Poole et al. entitled "Two-mode spatial-mode converter using periodic core deformation", Electronics Letters 15 Aug. 1994 Vol. 30 No. 17 pp 1437–8, discloses how a similar mode coupling filtering effect may be achieved by the creation of a photo-induced grating in an optical fibre, but is primarily concerned with an alternative method of inducing mode coupling, namely a method, hereinafter referred to as the ablation method, that involves using a laser to ablate material from the side of the fibre at equispaced localised intervals along its length, and then heating those regions so that surface-tension effects produces a similarly localised wrinkle in the core of the optical fibre. The authors of this letter suggest that an advantage of the ablation method over the photo-induced grating method is that the perturbations achievable by photo-induced refraction index changes are limited in magnitude to inconveniently small values, whereas the ablation method can be used to write much larger perturbations.

SUMMARY OF THE INVENTION

The present invention is similarly directed to a method of producing mode-coupling optical fibre notch filters whose periodic perturbations are comparable with those readily achievable using the ablation method, but which is distinguished from the ablation method inter alia in that each perturbation is created using a single stage process, and in that the creation of the perturbations does not involve any deliberate off-axis deviation of the fibre core.

According to the present invention there is provided a method of generating an optical notch filter in an optical fibre by creating therein a resonantly coupled iterative set of axially spaced perturbations each of which is created by axially stretching the fibre to produce plastic deformation in a heat softened zone thereof which is sufficiently sharply localised to result in the formation thereat of a non-adiabatic taper which weakly couples the zero order mode of the fibre with a higher order mode to provide a coupling coefficient small compared with 3 dB and substantially uniform over a wavelength range large compared with the FWHM bandwidth of the notch filter.

Preferably, the number of grating elements in the notch filter is at least ten. Preferably, the grating elements are substantially identical, and spaced at substantially equal intervals. Increasing the number of such filter elements has the effect of narrowing the spectral width of the notch, and of deepening it.

A characteristic of this method is that it can readily be performed on a reduced diameter portion of standard single mode fibre so as to reduce the temperature sensitivity of the resulting filter in comparison with an equivalent filter in which the method is applied directly to the full size single mode fibre.

The method of making notch filters according to the present invention may be seen as having superficial resemblance to the method of making optical filters that is described in U.S. Pat. No. 4,946,250, but in reality there are significant differences in these two approaches to optical filter manufacture.

Each of the filters specifically exemplified in U.S. Pat. No. 4,946,250 has only two biconical tapers in a length of single-mode optical fibre. The US specification clearly contemplates in principle the possibility of filters with more than two of these biconical tapers, but says nothing concerning how in practice they should be configured. The difference between the number of biconical tapers typically employed to make a filter according to the teachings of U.S. Pat. No. 4,946,250 and the number of perturbations typically employed to make a filter according to the teachings of the present invention suggests that the biconical tapers of the former and the perturbations of the latter do not have the same function, and closer examination reveals that this is indeed the case.

U.S. Pat. No. 4,946,250 explains (column 4 lines 33 to 55 with reference to its FIG. 2) that each of its perturbations is composed of three regions, comprising two conical regions 11 and 12 optically coupled by an intervening central region 13. In the conical regions there is mode coupling between the core and cladding modes, whereas in the intervening region, which is multimode, there is not. The US specification later explains (column 7 lines 46 to 60 with reference to its FIG. 7) that the elongation of the taper (perturbation) produces, for a given wavelength λp, the oscillating characteristic of its FIG. 7. Now it will be evident that, for this type of oscillatory characteristic to occur, the first conical region (11) must convert approximately half the core mode power into cladding mode power. Under these conditions, with certain values of elongation, the phase slippage introduced by differences in propagation constant in the intervening region (13) is such as to make the second conical region (12) convert substantially all that cladding mode power back into core mode power (producing the peaks of the FIG. 7 characteristic), while, with certain other values of elongation, the phase slippage is such as to make the second conical region convert substantially all the remaining core mode power into cladding mode power (producing the troughs of the FIG. 7 characteristic). The three regions of a taper are thus seen to function as a Mach Zehnder whose beam-splitter and beam-combiner are both wavelength sensitive. This taper is followed by one or more other tapers, also functioning as Mach Zehnders which may, or may not, be identical with the first. The spectral characteristic of the resulting combination is dependent, not only upon the spectral characteristics of each of the individual Mach Zehnders that go to make up the combination, but also upon the phase slippage effects produced between core and cladding mode propagation in each length of fibre that couples each of the Mach Zehnders to its successor in the combination. As the specification explains (column 6, lines 21 to 23), even with a combination comprising a tandem arrangement of only two tapers, the large number of parameters involved in determining the spectral characteristic of the combination make it possible to construct such filters with many different types of spectral characteristics. The downside of this is, however, that the large number of parameters involved militates against manufacturing reproducibility of any particular spectral characteristic.

In the case of the perturbations of the present invention, though these have a generally biconical shape, each perturbation is so shallow and so short as to provide in effect a single coupling region in which the zero order mode and a higher order mode are weakly coupled to an extent small compared with 3 dB. Because of the small value of the coupling coefficient, that coupling is substantially independent of wavelength. (This in direct contrast with the wavelength sensitivity of the coupling between these modes provided by the conical regions 11 & 12 of the filters of U.S. Pat. No 4,946,250.) The spectral characteristics of notch filters according to the present invention are therefore dependent substantially exclusively upon the number and spacing of the perturbations. These notch filters are therefore manufacturable with a more readily achievable degree of reproducibility, small changes in profile of the perturbations having minimal perturbing effect upon the resulting spectral characteristics of such filters. It may also be noted that the filters of U.S. Pat. No. 4,946,250 and of the present invention are of entirely different order of bandwidth magnitude, thus the filter of U.S. Pat. No. 4,946,250 FIG. 9 has a FWHM pass bandwidth of about 1800 nm, whereas that of an eighteen perturbation notch filter exemplifying the present invention has a FWHM stop bandwidth of about 19 nm.

BRIEF DESCRIPTION OF THE DRAWINGS

There follows a description of a method of generating an optical notch filter in an optical fibre by a method embodying the invention in a preferred form. Because of superficial similarities between the method and the ablation method to which previous reference has been made, this description will be prefaced, for purposes of comparison, with a short description of the ablation method. The description refers to the accompanying drawings in which:

FIGS. 1a and 1b depict successive stages in the prior art ablation method of inducing core/cladding mode coupling in a length of optical fibre.

DETAILED DESCRIPTION OF PREFERRED EMBODIMENTS

Figure 2:
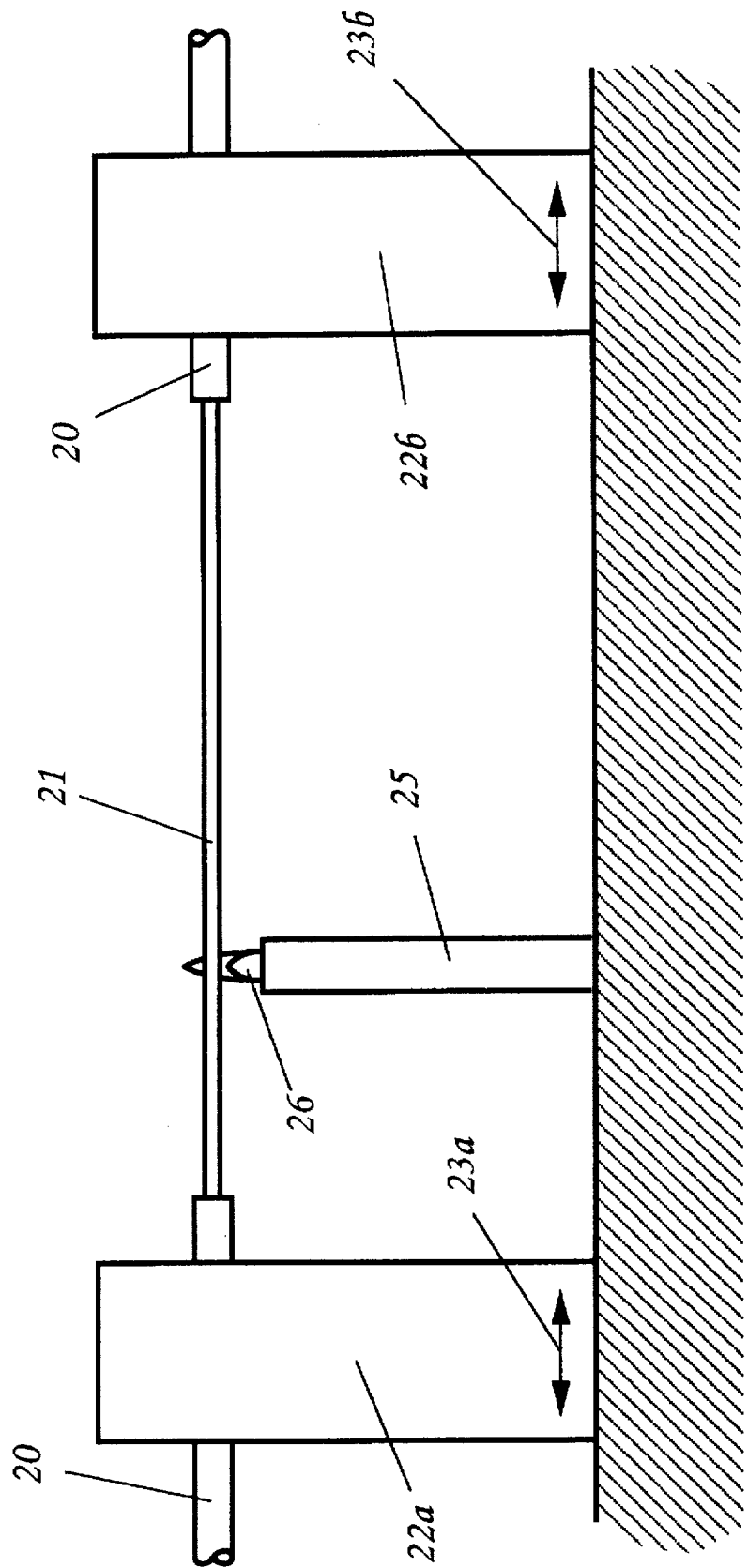
FIG. 2 depicts apparatus employed in performance of the preferred method of the present invention, FIGS. 3 and 4 respectively depict a single perturbation and a set of equispaced perturbations created in a length of optical fibre to induce mode coupling in it according to the preferred method of the present invention.

Referring to FIG. 1a, a pulsed focused beam of light from a $CO_2$ laser (not shown) is employed to ablate material from the side of a length 10 of circularly symmetric optical fibre. In this way a series of notches 11 are cut into the side of the fibre at regularly spaced intervals. The notches 11 are not deep enough to reach the core 12 of the fibre 10, and so the effective refractive index of the, fibre is substantially unchanged by the cutting of the notches 11. Accordingly the cutting of the notch does not of itself induce any appreciable core/cladding mode coupling. This is achieved by a second stage of processing, depicted in FIG. 1b, that comprises locally heat softening the fibre in the vicinity of each notch in turn so that under the effects of surface tension each notch 11 is smoothed out to form a waisted region 13 of substantially circularly symmetric profile. In the course of this smoothing-out process a wrinkle 14 is formed in the core.

For the making of an optical fibre notch filter according to the preferred method of the present invention, a central section of the plastic protective coating, typically an acrylate coating, of a plastics protective coated length 20 (FIG. 2) of single mode fibre is stripped from the fibre and the bare fibre 21 thereby exposed is acid cleaned. The fibre 20 is mounted by its plastics coated ends between two clamps 21a and 21b so that the exposed bare fibre 21 extends in a straight line. The two clamps 22a, 22b are independently motor driven in a controlled manner along a common line indicated by arrows 23a and 23b that is aligned with the direction of axial extent of the bare fibre 21. A sharply localised heat source, for instance provided by a microburner 25 burning a methane/oxygen mixture, is mounted so as to be moveable in a motor-driven controlled manner along direction that extends at right-angles the axis of the bare fibre 21 between the two clamps 22a and 22b, and so as to be moveable into and out of registry with a short potion of that bare fibre. The jet of the microtorch may conveniently be provided by hypodermic tubing providing a flame 26 with a width in the axial direction of the fibre of about 800 μm.

The flame 26 of the microburner 25 is employed to provide a relatively sharply localised heat-softened zone in the bare fibre 21, and the two clamps 23a and 23b are moved apart a controlled distance to cause a biconical neck 30 (FIG. 3) to form in the fibre by plastic flow of its glass. At the same time a similar biconical taper is formed in the core 31 of the fibre 21. The forming of this biconical taper can be performed as a non-overlapping sequence of operations comprising, first moving the flame into position around the fibre, next moving the clamps apart the requisite amount, and then removing the flame. The avoidance of overlapping of these operations is however not essential because the fibre is able to withstand a certain amount of tensile strain before its temperature has been raised sufficiently to cause such strain to be relieved by plastic flow, and because there will be a certain interval of time between the commencement of the removal of the flame and the lowering of the temperature of the fibre to an extent where plastic flow is no longer possible.

With conventional 125 μm external diameter single mode transmission type fibre, it is found that reducing the fibre diameter down from 125 μm to about 95 μm over a total distance 'd' from one end of the biconical taper to the other of about 800 μm, provides a large enough taper angle to produce a non-adiabatic perturbation of the transmission properties of the fibre which weakly couples the zero order (core) mode and one of the higher order (cladding) modes of the fibre to provide a coupling coefficient that is small compared with 3 dB and substantially uniform over a wavelength range large compared with a few tens of nanometers.

After the formation of the first perturbation, the two clamps are indexed along a predetermined distance before repeating the operation to produce the next perturbation. In this way a whole set of perturbations are created as depicted in FIG. 4. The completed structure may conveniently be packaged with the bare fibre supported by its plastics jacketed ends in a longitudinally extending channel formed in the side of a silica support rod (not shown).

Usually it will be desired that the perturbations are substantially identical and substantially equispaced. A periodic structure of this sort results in resonant coupling between the core-guided fundamental $HE_{11}$ (zero order) mode and the cladding-guided $HE_{12}$ (higher order) mode at a specific wavelength determined by the condition $$\lambda_c = p \cdot (n_{e1} - n_{e2})$$

where $\lambda_c$ is the centre wavelength p is the pitch of the periodic structure $n_{e1}$ is the effective refractive index of the $HE_{11}$ mode @$\lambda_c$, and $n_{e2}$ is the effective refractive index of the $HE_{12}$ mode @$\lambda_c$.

Optical power which is coupled out of the $HE_{11}$ mode into the $HE_{12}$ mode by the periodic structure is then attenuated by the acrylate plastics protective coating that surrounds the fibre downstream of the stripped region of bare fibre 21.

Figure 5:
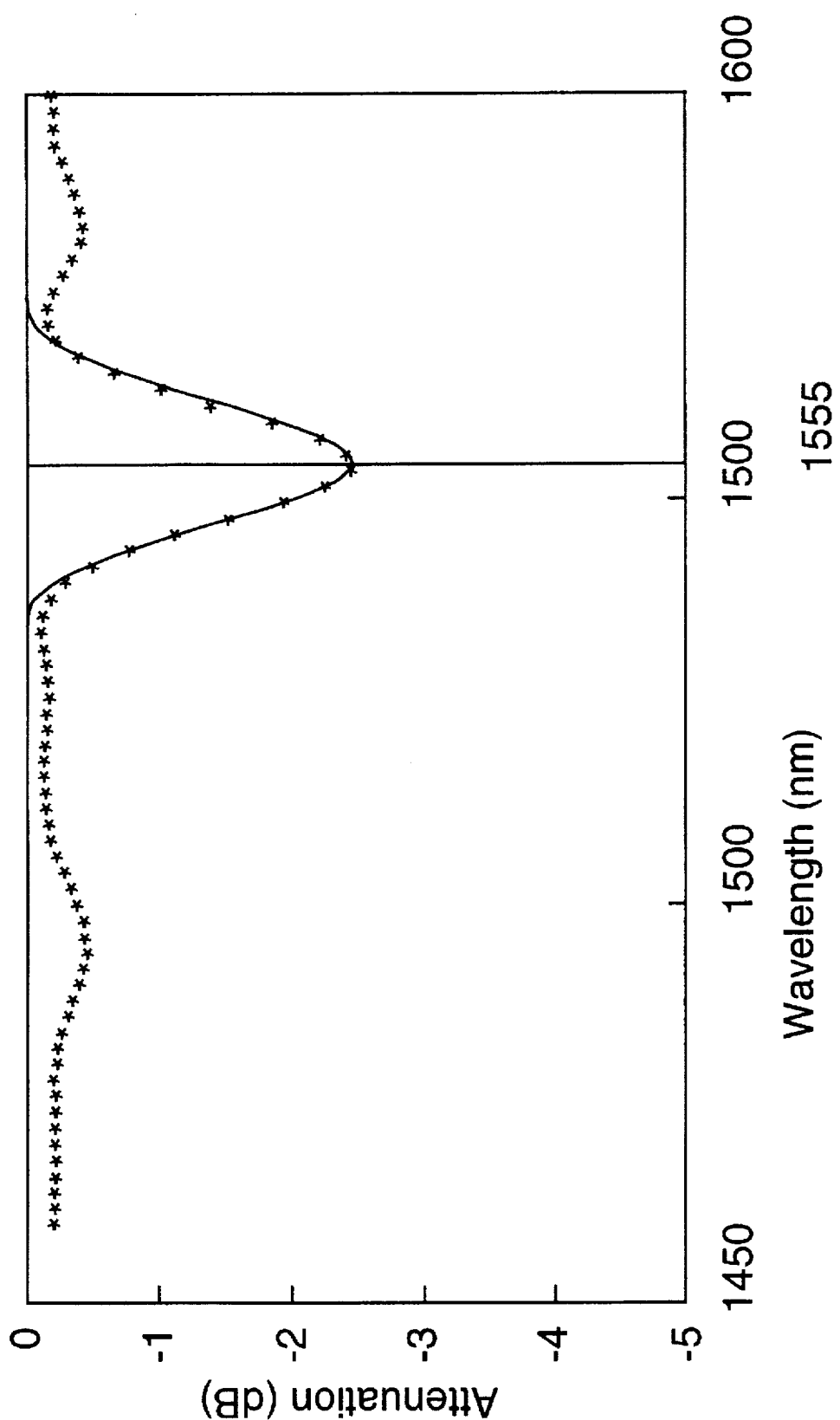
FIGS. 5 and 6 depict the spectral plots of two notch filters made by the method to be described with reference to FIGS. 3 and 4.
Figure 6:
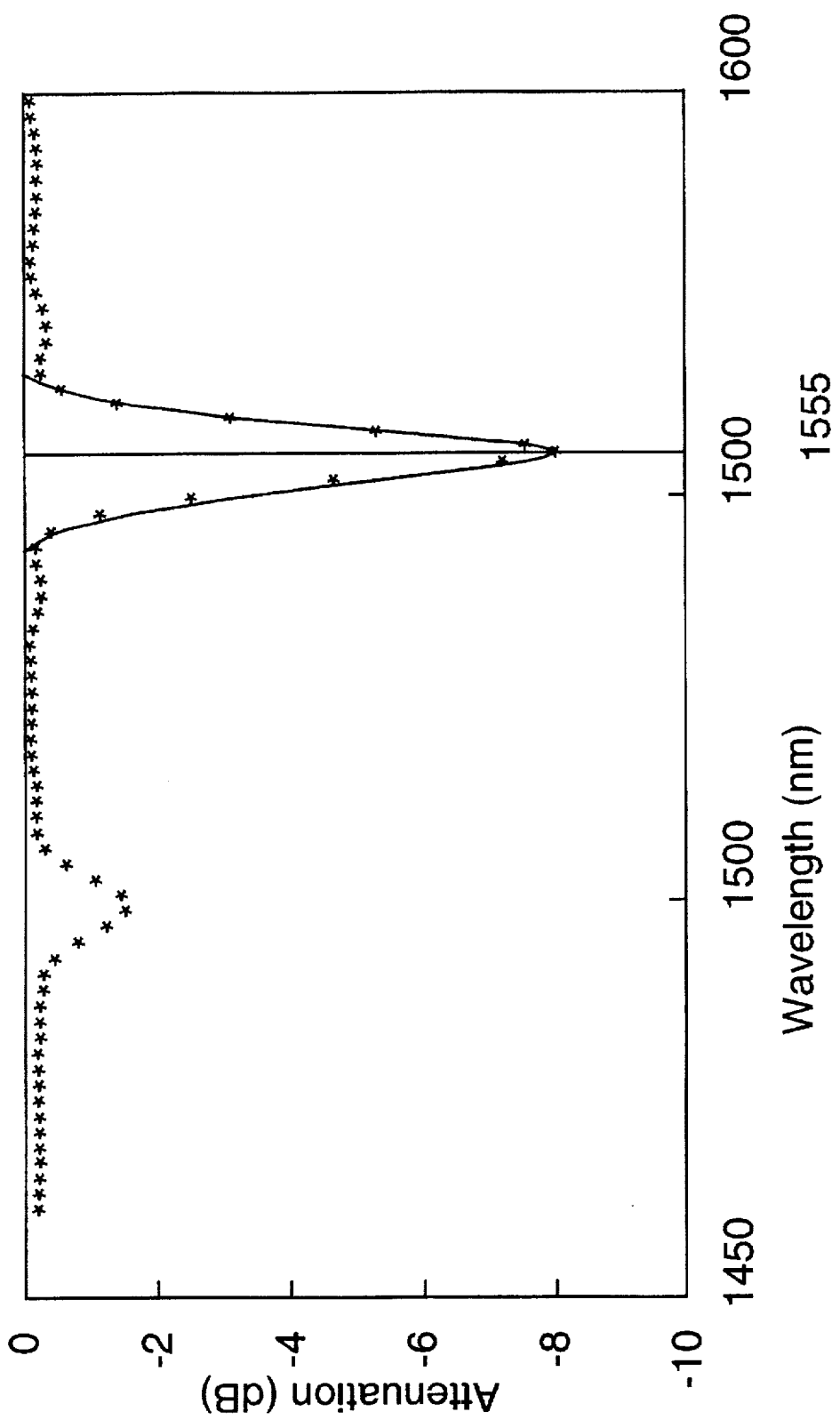

In FIGS. 5 and 6 are depicted the spectral gain characteristics of two notch filters made by the method described above with reference to FIGS. 2, 3 and 4 and designed for use in erbium doped optical fibre amplifiers to modify the shape of their spectral gain characteristics.

FIG. 5 shows the spectral response of a filter having 18 elements (perturbations) with a pitch of 1.7 mm. The filter has a centre wavelength of 1555 nm with a peak attenuation of 2.4 dB and a FWHM bandwidth of 19 nm. The loss at the 1480 nm pump wavelength is less than 0.2 dB. It will be observed that a secondary resonance is also present that is centred on 1495 nm. This is a potential problem for a filter design requiring its major resonance to be in the region of 1533 nm as this would move the secondary resonance to the region of 1475 nm. However, from experiments on other designs of single mode fibre, it appears that the separation of these two resonances varies significantly with fibre design, and so any such potential problem can be avoided by choice of a different design of single mode fibre. This problem of the secondary resonance can alternatively be circumvented by changing the pump wavelength from 1480 nm to 980 nm, at which latter wavelength the absorption is less than 0.1 dB.

FIG. 6 shows how, by the use of additional filter elements (perturbations) the spectral characteristic can be narrowed and deepened. In this instance the filter is substantially the same as that of FIG. 5 except for having 31 elements instead of 18, resulting in a filter with a peak attenuation of 8 dB and a FWHM bandwidth of 10 nm.

The centre wavelength of the filter can be adjusted simply by changing the spatial separation of the filter elements. In the case of the fibre used in the making of the filters of FIGS. 5 and 6, it was found that a change of pitch of 10 μm resulted in a 5 μm shift in the centre wavelength of the filter.

For some applications the temperature sensitivity of filters produced as specifically described above is inconveniently high. The reason for the temperature sensitivity is that the effective refractive index of the zero order (core) mode propagating in regions between adjacent tapers changes with temperature at a not insignificantly different rate from that of a higher order (cladding) mode because the core mode propagation is guided substantially exclusively by the interface between the fibre core (which is typically doped silica) and the fibre cladding (which is typically undoped or compensation doped silica), whereas the cladding modes are guided substantially exclusively by the interface between the cladding glass and the ambient.

Figure 7:
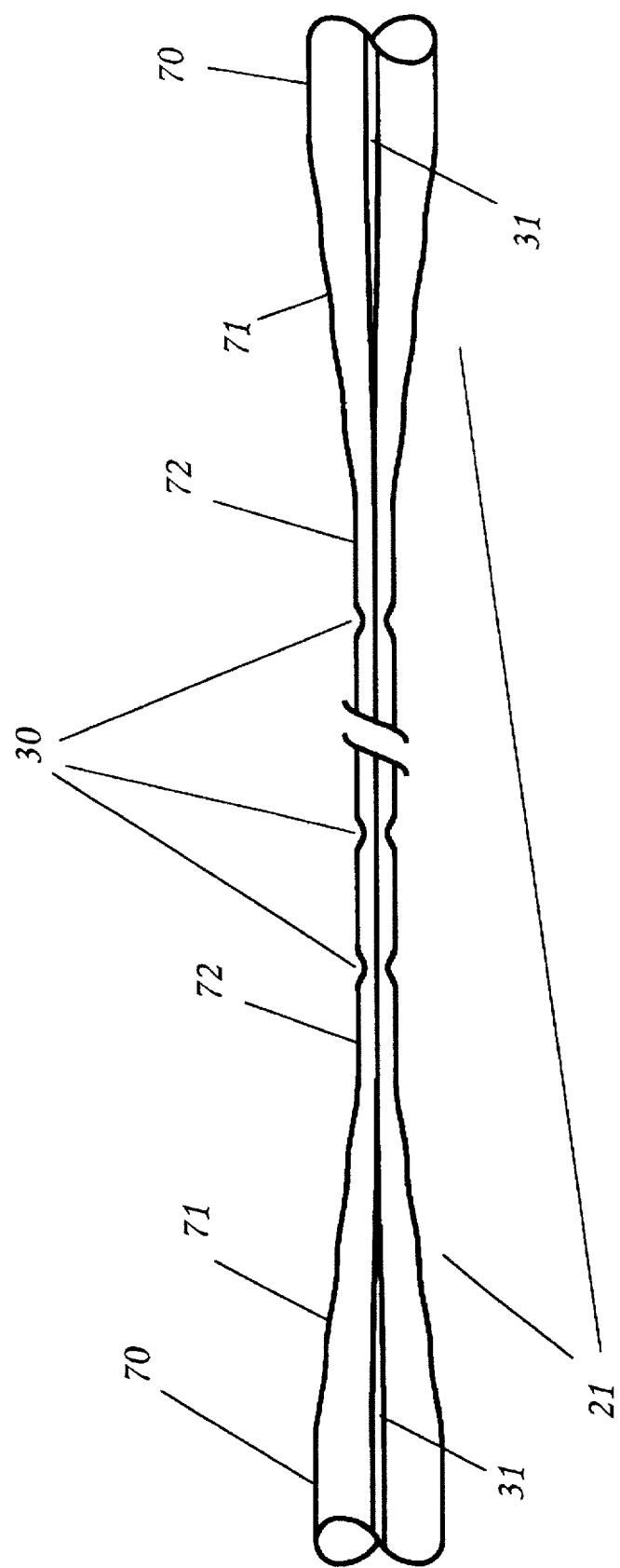
FIG. 7 depicts the arrangement of FIG. 4, but with the difference that the perturations are present in a reduced diameter portion of the fibre.

Temperature sensitivity can be significantly reduced by pre-tapering the fibre 21 prior to the creation of the biconical tapers 30. A filter that has been pre-tapered in this way is depicted in FIG. 7. At its extremities 70, the fibre is full-size single mode optical fibre, typically 125 μm diameter fibre, and here the zero order mode is guided substantially exclusively by the interface between the core 31 of the fibre and the cladding glass that surrounds that core. Inboard of these full-size extremities 70 are two adiabatic tapers 71 joined by a length 72 of reduced diameter fibre that is of uniform diameter, typically 40 μm diameter, until the creation therein of the biconical tapers 30.

On propagating from the large end of a taper 71 towards its small end the modal spot size of the zero order mode increases. Associated with this increase in modal spot size is a reduction in the guidance provided by the core/cladding interface, its place being taken-over by the guidance provided by the interface between the outer surface of the fibre and the ambient. For conventional 125 μm diameter single mode fibre this take-over is substantially complete by the time the fibre has been reduced in diameter from 125 μm to about 40 μm.

The basic apparatus of FIG. 3 may be employed for creating the pre-taper comprising the two adiabatic tapers 71 joined by the length 72 of reduced diameter uniform cross-section fibre, though typically it may be found preferable to use a slightly more substantial microburner 25 than the one subsequently used for making the biconical tapers 30. The pre-taper is made by performing a sequence of progressive stretching operations upon the fibre 21 after the manner described in GB 2 150 703, with the difference that in this instance it is a single fibre that is being progressively stretched rather than a twisted plurality of such fibres. In each of the stretching operations the two clamps 22a and 22b are moved at controlled speeds in the same direction, which is aligned with the axis of the fibre 21. This causes the localised heat-softened zone provided by the microburner to traverse steadily along the fibre for as long as is specifically required in any particular instance. The leading clamp is moved a predetermined small proportion faster than the trailing clamp, a proportion that may be different for traverses of the sequence, so that the fibre is progressively stretched, such stretching being accommodated by plastic flow of the heat-softened glass in the localised hot zone provided by the microburner.

The first stretching operation thus provides a small adiabatic taper at each end of the traverse, and between these two tapers the stretched fibre is of uniform cross-section having a slightly smaller diameter than that of the unstretched fibre on the far side of each taper. The second and succeeding stretching operations involve traverses that start and end at points ensuring that the overall tapering at each end remains adiabatic and that between these two overall tapers 71 the stretched fibre is of uniform diameter, whose magnitude is reduced step-wise with each traverse.

Figure 8:
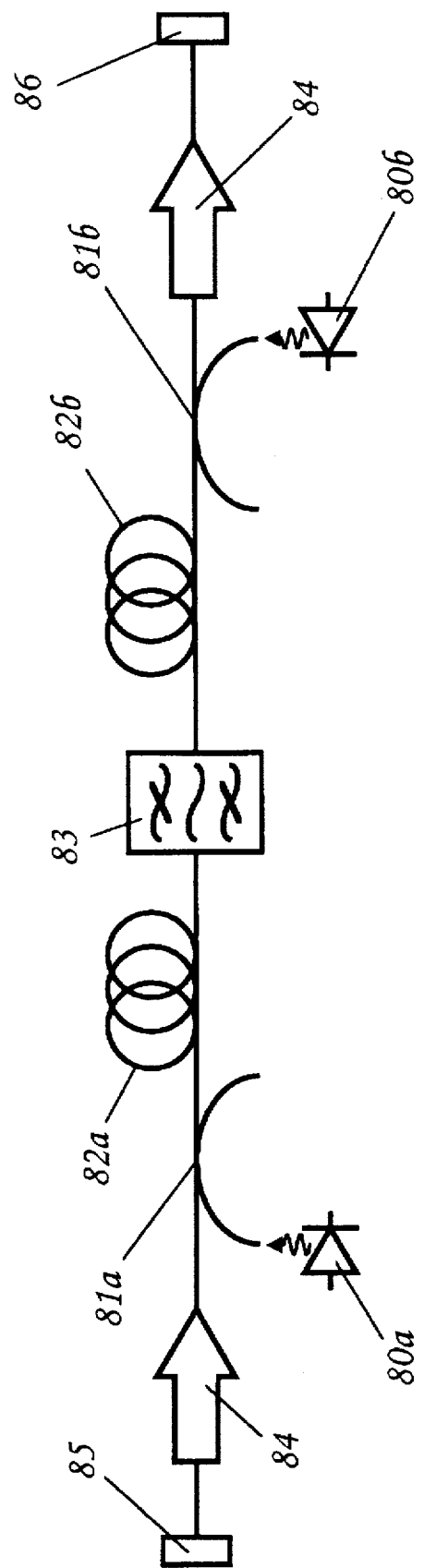
FIG. 8 is a schematic diagram of an optical fibre amplifier incorporating a notch filter made according to the method described with reference to FIGS. 3 and 4 or 3, 4 and 7.

It has been stated above that one of the particular applications for these filters is for modifying the shape of the gain characteristic of optical fibre amplifiers. FIG. 8 is a schematic diagram of one example of such an amplifier incorporating such a filter. The amplifier has two injection laser diode pumps 80a and 80b, two pump/signal wavelength multiplexing 2×2 couplers 81a and 81b, a length of erbium doped optical amplifier fibre divided into two sections 82a and 82b optically coupled by a notch filter 83 made by the method of the present invention. Additionally, the amplifier includes two optical isolators 84 and input and output terminals 85 and 86.

I claim:

1. A method of generating an optical notch filter in an optical fibre by creating therein a resonantly coupled iterative set of axially spaced perturbations each of which is created by axially stretching the fibre to produce plastic deformation in a heat softened zone thereof which is sufficiently sharply localised to result in the formation thereat of a non-adiabatic taper which weakly couples the zero order mode of the fibre with a higher order mode to provide a coupling coefficient small compared with 3 dB and substantially uniform over a wavelength range large compared with the FWHM bandwidth of the notch filter.

2. A method as claimed in claim 1, wherein the perturbations are substantially identical and created at substantially equispaced intervals along the axial direction of this fibre.

3. A method as claimed in claim 1, wherein the number of perturbations is at least ten.

4. An optical fibre notch filter made by the method claimed in claim 1.

5. An optical fibre amplifier that includes a notch filter as claimed in claim 4.

6. A method of generating an optical notch filter in an optical fibre by creating therein a resonantly coupled iterative set of axially spaced perturbations each of which is created by axially stretching the fibre to produce plastic deformation in a heat softened zone thereof which is sufficiently sharply localised to result in the formation thereat of a non-adiabatic taper which is weakly couples the zero order mode of the fibre with a higher order mode to provide a coupling coefficient small compared with 3 dB and substantially uniform over a wavelength range large compared with the FWHM bandwidth of the notch filter wherein the optical fibre is a single mode optical fibre which, prior to the creation of the spaced perturbations, is pretapered to provide, between two full-sized portions of the single mode fibre, two adiabatic tapers joined by a reduced diameter portion of the single mode fibre which zero order mode power is guided substantially exclusively by the interface between the material of the fibre and the ambient surrounding the reduced diameter portion of the fibre, and wherein the spaced perturbations are created in the reduced diameter portion.

7. A method as claimed in claim 6, wherein the perturbations are substantially identical and created at substantially equispaced intervals along the axial direction of this fibre.

8. A method as claimed in claim 6, wherein the number of perturbations is at least ten.

9. An optical fibre notch filter made by the method claimed in claim 6.

10. An optical fibre amplifier that includes a notch filter as claimed in claim 9.

* * * * *